US007243773B2

(12) United States Patent
Bochonok et al.

(10) Patent No.: US 7,243,773 B2

(45) Date of Patent: Jul. 17, 2007

(54) REMOVABLE COIN BIN

(75) Inventors: Steve T. Bochonok, Wauconda, IL (US); John R. Blake, Chicago, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 36 days.

(21) Appl. No.: 10/991,017

(22) Filed: Nov. 17, 2004

(65) Prior Publication Data

US 2005/0067305 A1 Mar. 31, 2005

Related U.S. Application Data

(63) Continuation-in-part of application No. 10/251,211, filed on Sep. 20, 2002, now Pat. No. 6,854,640.

(51) Int. Cl.
*B60T 1/14* (2006.01)

(52) U.S. Cl. .......................................... 194/350; 188/5

(58) Field of Classification Search ................ 194/350; 280/47.371; 188/19

See application file for complete search history.

(56) References Cited

U.S. PATENT DOCUMENTS

| | | | | |
|---|---|---|---|---|
| 3,307,658 | A * | 3/1967 | Stevenson | 188/5 |
| 3,416,337 | A | 12/1968 | Hutchins | 70/284 |
| 3,566,994 | A * | 3/1971 | Isaacs | 188/5 |
| 3,903,721 | A | 9/1975 | Aaron | 70/423 |
| 4,302,025 | A * | 11/1981 | Waddell et al. | 280/79.11 |
| 4,380,316 | A | 4/1983 | Glinka et al. | 232/16 |
| 4,534,492 | A | 8/1985 | Schwarzli | 221/203 |
| 4,557,282 | A | 12/1985 | Childers et al. | 133/3 A |
| 4,964,495 | A | 10/1990 | Rasmussen | 194/344 |
| 5,097,934 | A | 3/1992 | Quinlan, Jr. | 194/200 |
| 5,157,888 | A * | 10/1992 | Lindquist | 52/745.01 |
| 5,390,515 | A | 2/1995 | Essick | 70/63 |

(Continued)

FOREIGN PATENT DOCUMENTS

WO WO99/00776 1/1999

OTHER PUBLICATIONS

Complaint, *Cummins-Allison Corp.* v. *Glory Ltd., Glory Shoji Co. Ltd., and Glory* (*U.S.A.*) *Inc.*, Civil Action No. 02C-7008, United States District Court, Northern District of Illinois, Eastern Division.

(Continued)

*Primary Examiner*—Patrick Mackey
*Assistant Examiner*—Mark J. Beauchaine
(74) *Attorney, Agent, or Firm*—Nixon Peabody LLP

(57) ABSTRACT

A removable coin storage apparatus is used in a coin processing device, and includes a removable bin for storing and transporting coins. The removable bin has a stopped position and a moving position. The coin storage apparatus further includes a brake device that is pivotally coupled to the removable bin for preventing movement of the removable bin in the stopped position. The brake device has a manually moveable element that is movable between a first position and a second position, each one of the first position and the second position corresponding to one of the stopped position and the moving position of the removable bin. The brake device also has a contact surface for exerting a frictional force on a floor surface in the stopped position of the removable bin.

3 Claims, 13 Drawing Sheets

U.S. PATENT DOCUMENTS

| | | | | |
|---|---|---|---|---|
| 5,431,254 | A * | 7/1995 | Kramer et al. | 188/7 |
| 5,469,951 | A | 11/1995 | Takemoto et al. | 194/206 |
| 5,619,932 | A | 4/1997 | Efland et al. | 109/24.1 |
| 5,620,079 | A | 4/1997 | Molbak | 194/217 |
| 5,765,250 | A * | 6/1998 | Lee | 15/49.1 |
| 5,799,767 | A | 9/1998 | Molbak | 194/217 |
| 5,982,918 | A | 11/1999 | Mennie et al. | 382/135 |
| 6,082,519 | A * | 7/2000 | Martin et al. | 194/350 |
| 6,264,545 | B1 | 7/2001 | Magee et al. | 453/3 |
| 6,651,992 | B1 * | 11/2003 | Smith, Sr. | 280/47.26 |

OTHER PUBLICATIONS

Billcon Corporation, Brochure for CCS-60/CCS-80 Series Coin Counter-Sorter, 2 pages (Oct. 1999).
Billcon Corporation, Photos for CCS-60/80, 1 page (Japanese language) (Oct. 12, 2000).
De La Rue Cash Systems, Inc., Brochure for ACD Automatic Coin Dispenser, 2 pages (no date).
De La Rue Cash Systems, Brochure for MACH 12 Coin Sorter/Counter, 2 pages (1999).
De La Rue Cash Systems, Brochure for MACH 12HD Coin Sorter/Counter, 2 pages (no date).
Glory, Brochure for GSA-500 Sortmaster, 2 pages (no date).
Magner, Brochure for COINSTREAM™ CPS 502 Self-Service Coin Processing System, 2 pages (no date).
Magner, Brochure for MAG II 100 Series Coin Sorters, 2 pages (no date).
Magner, Brochure for MAG II Model 915 Coin Counter/Packager, 2 pages (no date).
Magner, Brochure for Pelican 305 Coin Sorter, 2 pages (no date).
Magner, Brochure for 900 Series Coin Counters and Packagers, 2 pages (no date).

* cited by examiner

REMOVABLE COIN BIN

CROSS-REFERENCE TO RELATED APPLICATIONS

This application is a continuation-in-part of U.S. patent application Ser. No. 10/251,211, filed Sep. 20, 2002 now U.S. Pat. No. 6,854,640, which is incorporated herein by reference in its entirety.

FIELD OF THE INVENTION

This invention is directed generally to coin handling devices and, more specifically, to a removable coin bin for use in a coin redemption machine.

BACKGROUND OF THE INVENTION

Coin storage devices are widely used in a variety of coin processing machines, such as coin redemption machines, automated teller machines (ATMs), vending machines, gaming machines, and toll booth machines. Regardless of whether these coin processing machines are designed to perform one function, such as counting a number of coins, or several functions, such as counting, sorting, and identifying the coins, all coin processing machines usually require a convenient device for storing the coins after they have been processed. Some examples of such storage devices are bins, bags, trays, boxes, containers, and other similar devices.

According to one particular need, some coin processing machines may require the use of more than one storage device. For example, if sorting is relevant, a coin processing machine may output the coins to two or more storage devices, sorting the coins by denomination. If in a particular application the weight of the stored coins is of concern, then the coin processing machine may distribute the processed coins to two or more storage devices to avoid having a single, heavier storage device.

The design of the storage devices must generally take in account at least two factors: the easy removal of the coins, for further processing such as depositing in a bank, and the unauthorized removal of the coins, for preventing theft. Furthermore, some storage devices are designed to permit easy removal after being partially filled, while others are designed to permit easy removal only after being completely filled.

One problem that exists in some prior art devices is that manual intervention is required to remove the coins from the storage device, wherein an operator physically removes small amounts of coins at a time until the entire amount of coins has been removed. Aside from being time consuming, the manual intervention is also susceptible to the loss of coins, either through the operator losing or stealing coins.

Another problem that exists in some prior art devices is that transportation of a storage device is extremely difficult. Because some of these storage devices can weigh hundreds of pounds, such as around 500 pounds, it might take more than one person to lift and transport a storage device. The transportation difficulty becomes even more troublesome if the storage device is located in a hard-to-get position, such as in a container designed to tightly enclose the storage device. Unless the storage device is designed for allowing a single person to easily transport the heavy load, the process of transporting such a storage device can become unduly cumbersome, if not nearly, impossible. Similarly, some prior art devices are inadequate because they are not specifically designed to facilitate transportation by using commercially available transportation machines, such as a hand-operated truck, a motorized truck, or a forklift.

One other problem experienced during transportation of coins is that a removable coin bin can become unstable when the bin is empty. For example, an empty coin bin may fall from a forklift during transportation because the coin bin is not structurally balanced without the coins. Thus, if a coin bin is unloaded while located on a forklift, the coin bin can suddenly change from a stable position to an unstable position, potentially causing damage to property and injury to an unaware person.

Inadequate control of a coin bin, during transportation, is another problem that is found in current coin bins. A stopped coin bin that does not have an adequate brake device can create problems because the heavy load that is being transported, e.g., over 500 pounds of coins, can render any unintended movement of the coin bin uncontrollable by an average person. For example, it might be dangerous for a person to temporarily stop on a slanted surface if the coin bin does not have a proper brake. Any unintended movement of the coin bin can possibly cause personal injury and/or property damage.

Yet another problem that occurs in some prior art devices is that the security of the coins might be compromised. Some prior art devices do not have locks, relying instead on the integrity and honesty of the operators. Other prior art devices require at least two locks, a lock for the door used to deposit the coins and a lock for the door used to remove the coins. Consequently, the tasks in removing and depositing coins double, wherein each lock must be locked and unlocked. Furthermore, an operator must keep track of two different keys or combinations. Other prior art devices are secure, but the security is provided at the expense of simplicity, efficiency, and cost. For example, one prior art device is available that uses a key in a coin processing machine to automatically lock and close a coin storage device when it is removed from the coin processing machine, and to automatically unlock and open it when it is inserted into the coin processing machine. Seemingly convenient, this type of device is not only expensive, but it also adds extra components that require maintenance, and that limit the use of the coin storage device to a limited number of coin processing machines.

Therefore, an object of the present invention is to provide a coin storage device that is designed to facilitate the easy removal of coins. Another object of the present invention is to provide a coin storage device that is easy to transport. Yet another object of the present invention is to provide a single secure and simple locking feature for a coin storage device.

SUMMARY OF THE INVENTION

A removable coin storage apparatus is used in a coin processing device, and includes a removable bin for storing and transporting coins. The removable bin has a stopped position and a moving position. The coin storage apparatus further includes a brake device that is pivotally coupled to the removable bin for preventing movement of the removable bin in the stopped position. The brake device has a manually moveable element that is movable between a first position and a second position, each one of the first position and the second position corresponding to one of the stopped position and the moving position of the removable bin. The brake device also has a contact surface for exerting a frictional force on a floor surface in the stopped position of the removable bin.

In another aspect of the current invention, a removable coins storage apparatus is used in a coin processing device, and includes a removable bin, a handle, and a brake. The removable bin includes a first opening to allow the placement of coins inside the removable bin, and a second opening to allow the coins to be discharged from the removable bin. The handle is pivotally coupled to the removable bin for transporting the removable bin, wherein the handle pivots between a plurality of pivoting positions including a first pivoting position corresponding to a stopped position of the removable bin. The brake prevents movement of the removable bin when the removable bin is in the stopped position. The brake has a handle end coupled to the handle for pivoting the brake in response to pivoting of the handle, and a contact surface for exerting a static frictional force in the stopped position of the removable bin.

In an alternative aspect of the current invention, a method for transporting a removable coin storage apparatus located in a coin processing device includes storing a plurality of coins in a removable bin. A front wheel of the removable bin is raised to prevent physical contact between the front wheel and a floor surface when the removable bin is in a stopped position. A brake device contacts the floor surface when the removable bin is in the stopped position.

The above summary of the present invention is not intended to represent each embodiment, or every aspect, of the present invention. Additional features and benefits of the present invention are apparent from the detailed description, figures, and claims set forth below.

Figure 1A:
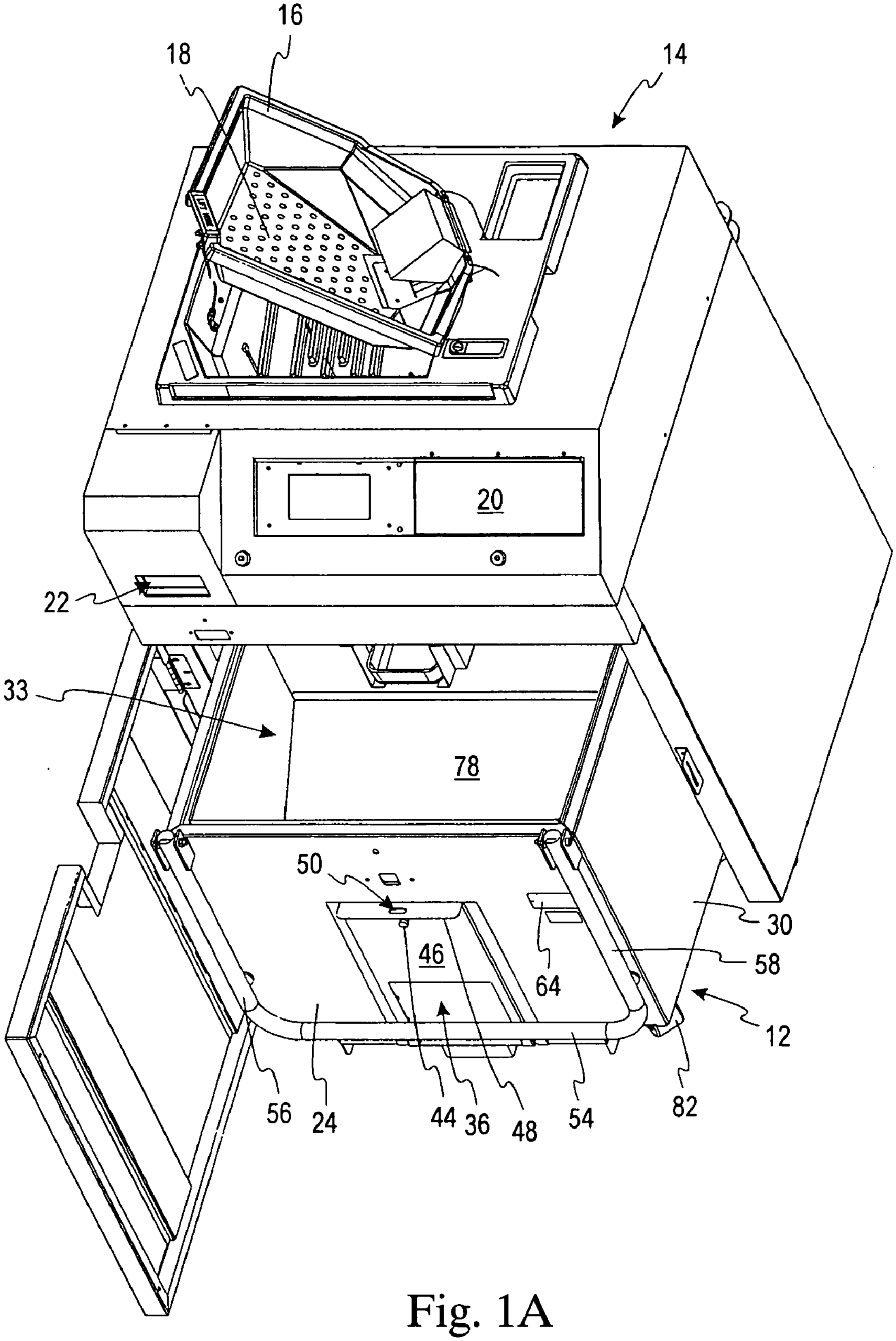
FIG. 1*a* is a perspective view of a removable coin bin according to one embodiment of the present invention as used in a coin processing machine.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENT

Figure 1B:
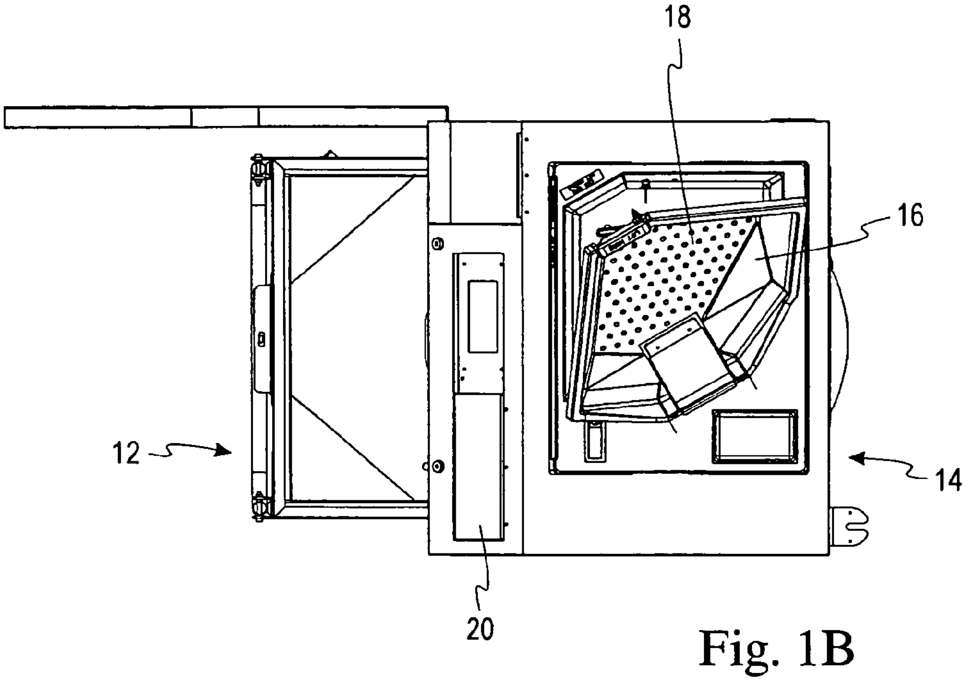
FIG. 1*b* is a plan view of FIG. 1*a;*
Figure 1C:
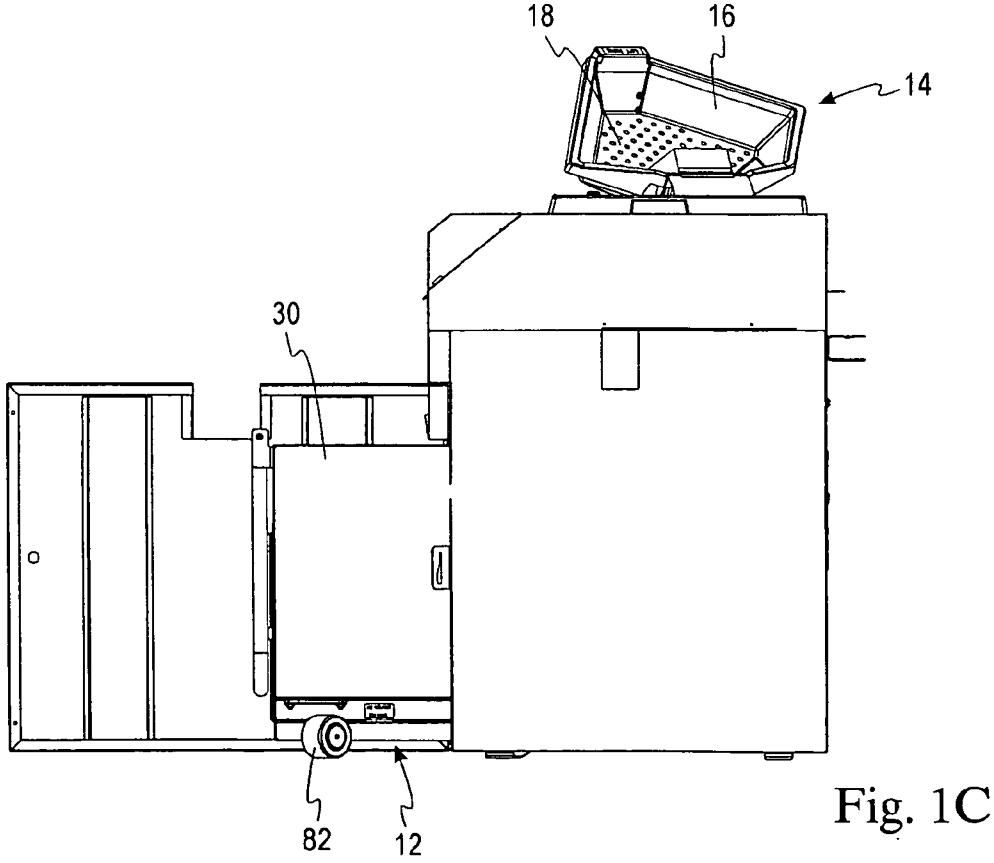
FIG. 1*c* is an end view of FIG. 1*a;*

Referring now to the drawings, and initially to FIGS. 1*a*–1*c*, a removable coin bin 12, i.e., a removable coin storage apparatus, according to the present invention is shown in usage with a coin processing device or machine 14. A detailed description of the coin bin 12 will be provided after a brief description of the coin machine 14. Note that the term coin machine 14 includes such machines as a coin redemption machine, automatic teller machine (ATM), coin counter, coin sorter, funds processing machine, vending machine, toll-booth machine, and a gambling machine. Also, the term coin is meant to include United States currency coins, international currency coins, and all types of tokens.

The coin machine 14 includes a coin input area 16 which receives coins of mixed or single denomination from a user. The coin input area 16 allows the user of the coin machine 14 to deposit the user's coins which will ultimately be converted to some other sort of fund source (e.g., banknotes, credit to a smartcard, credit to an account, credit for purchases in the store containing the coin machine 14, etc.) that is available to the user. The coin input area 16 includes a coin tray that has a perforated plate 18, which helps to direct the coins to a coin processing area within the coin machine 14. A coin tray similar to that described which may be used in connection with the coin input area 16 of the coin machine 14 is described in greater detail in U.S. Pat. No. 4,964,495 entitled "Pivoting Tray For a Coin Sorter," which issued on Oct. 23, 1990 and is incorporated herein by reference in its entirety.

A touch screen 20, or other user-input device, is included in the frontal area of the coin machine 14 to provide inputs from the machine user and to display outputs for viewing by the user. In addition to the touch screen 20, the coin machine 14 may also include a mechanical keyboard or buttons to receive such inputs.

The coin machine 14 further includes a media slot 22 into which the user may insert an account card (e.g., a bank card such as an ATM card, an identification card including the type distributed by grocery stores, smartcards, etc.). The media slot 22 is coupled to a media reader device or a media reader/writer device in the coin machine 14 that is capable of reading from or writing to one or more types of media including ATM cards, credit card, smartcards, or other types of media cards. This media may include various types of memory storage technology such as magnetic storage, solid state memory devices, and optical devices. The touch screen 20 typically provides the user with a menu of options which prompts the user to carry out a series of actions for identifying the user by displaying certain commands and requesting that the user depress touch keys on the touch screen 20 (e.g., a user PIN, account number, etc.).

In general, the coin machine 14 receives coins through the coin input area 16, and after these deposited coins have been processed (e.g., authenticated, counted, or sorted), the coin machine 14 outputs a receipt to the user indicative of the dollar amount of the deposited coins. For example, the user of the coin machine 14 may input $20.50 in various coins and the coin machine 14 prints a receipt indicating that $20.50 worth of coins have been processed. The user can redeem the receipt for funds from an attendant of the coin machine 14. An attendant may include a store employee such as a cashier at a grocery store or a teller at a bank. Alternatively, the user can redeem the receipt for credit towards purchases at the store where the machine is located and exchange for merchandise at the store. Alternatively still, the coin machine 14 credits a user's account such as a bank account or an account associated with a store credit card, a store "rewards" program card or a coupon-type card which a user produces at the time of purchase for discounts. Further, a commission may be charged for the use of the machine. Alternatively still, a bonus may be added onto the amount redeemed. For example, a store may desire to have a promotion to attract users into a store whereby by an amount (e.g., a percentage of the coins processed) in addition to the dollar amount of coins processed, an user receives credit towards purchases at the store. Additionally, the receipt can include other information such as a transaction number and totals for each coin denomination.

A coin redemption machine similar to the coin machine 14 that was described above, which may be used in connection with the coin bin 12, is described in greater detail in U.S. Pat. No. 5,982,918 entitled "Automatic Funds Processing System," which issued on Nov. 9, 1999 and is incorporated herein by reference in its entirety.

Figure 2A:
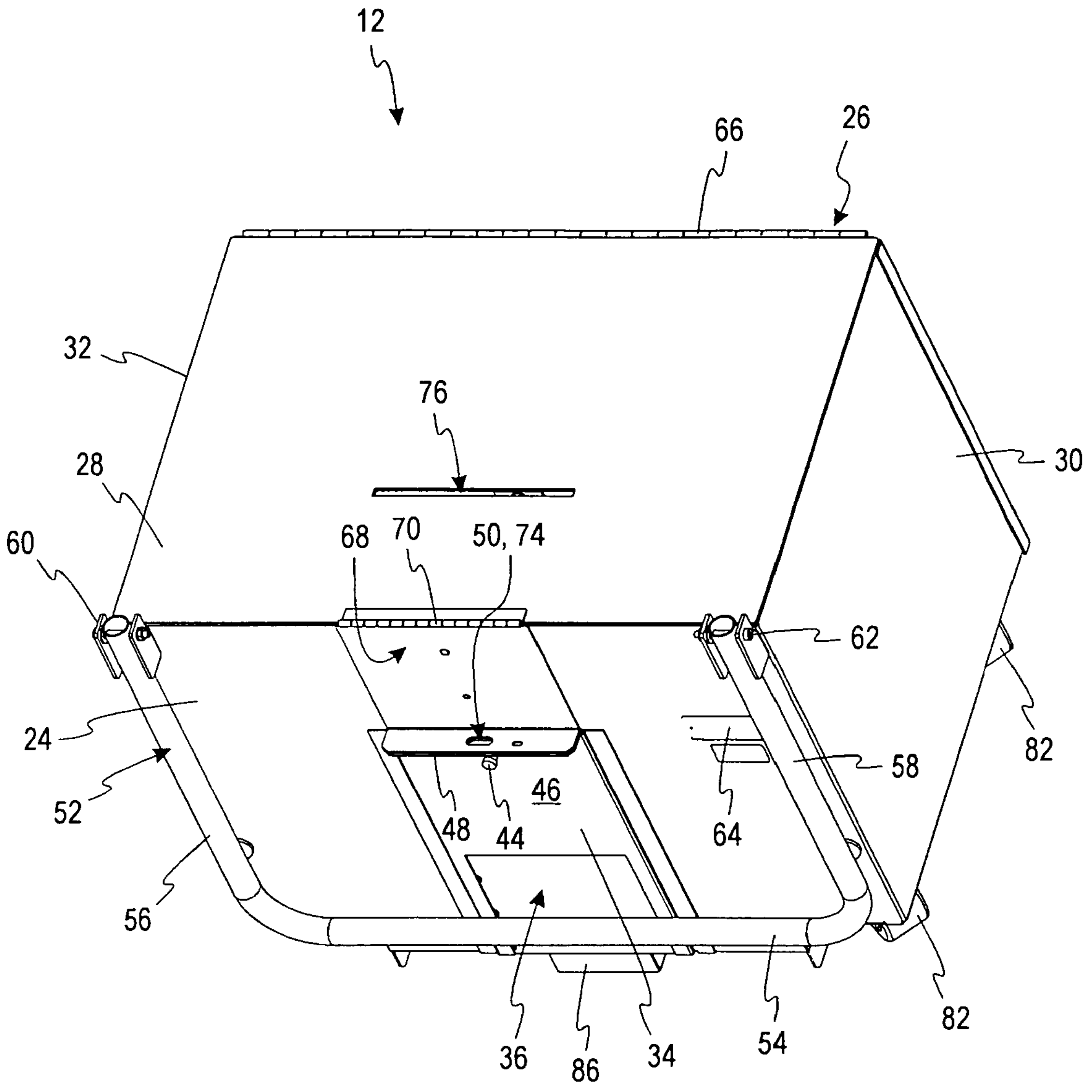
FIG. 2*a* is a perspective view of the embodiment shown in FIG. 1*a* having a cover over the first opening through which coins enter the bin.
Figure 2B:
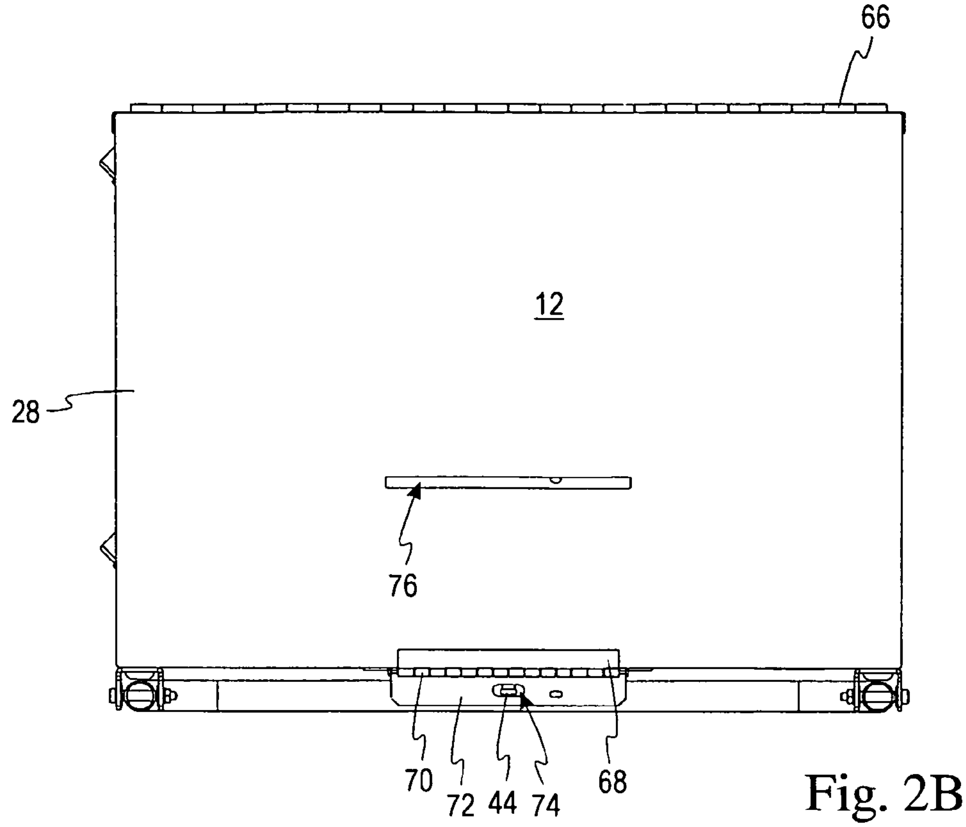
FIG. 2*b* is a plan view of FIG. 2*a;*
Figure 2C:
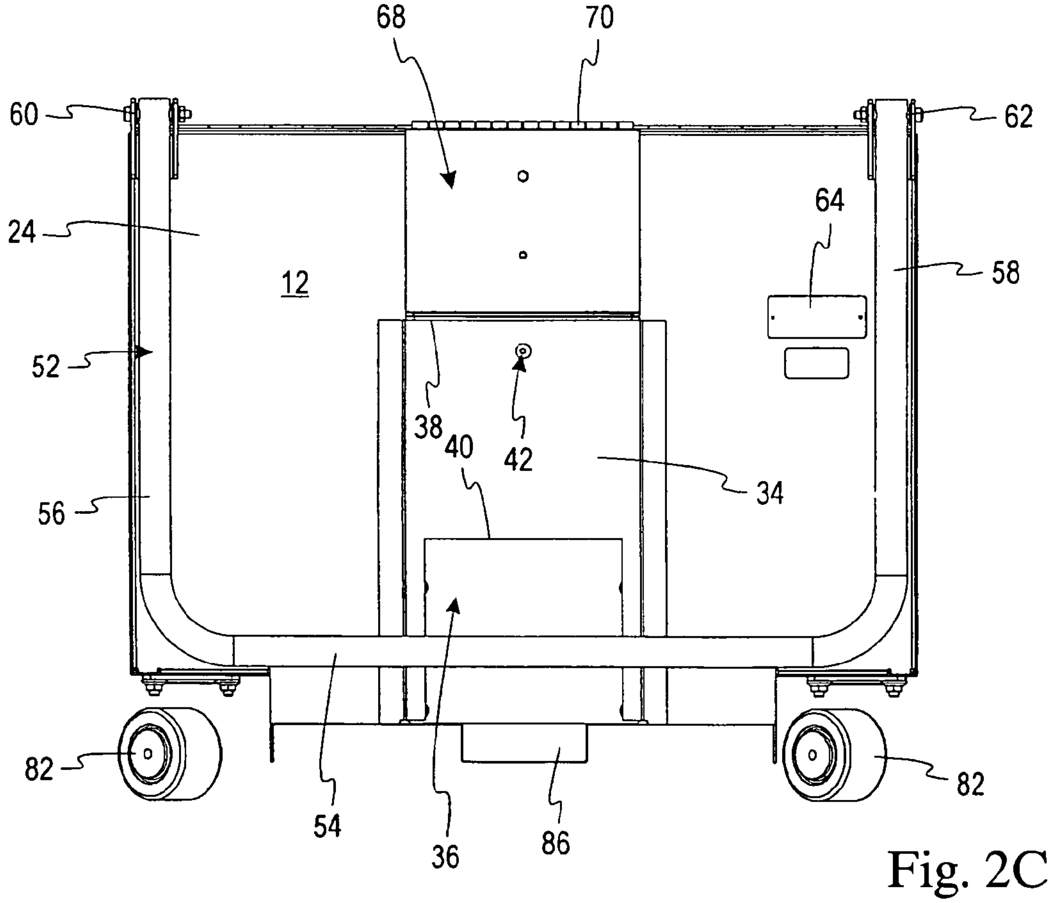
FIG. 2*c* is a front view of FIG. 2*a*.

Referring to FIGS. 1*a*–1*c* and also to FIGS. 2*a*–2*c*, one embodiment of the coin bin 12 will be described in detail. The coin bin 12 is structurally a bin or receptacle having the general shape of a box, which includes a front plate 24, a back plate 26, and a cover plate 28 that is connected to the back plate 26. A first side plate 30 and a second side plate 32 are rigidly connected to the front plate 24 and the back plate 26, forming the basic structure of the coin bin 12 and a coin depositing opening 33 (shown in FIG 1*a*).

The front plate 24 includes a pocket 34 centrally located between the first side plate 30 and the second side plate 32, and a coin removal opening 36 located below the pocket 34. The pocket 34 is vertically oriented along the front plate 24, with its width being parallel to the cover 28, and it protrudes out of the front plate 24. Also, the pocket 34 has a first open end 38 and a second open end 40, and it includes a pin hole 42 located proximate the first open end 38. The coin removal opening 36 is located next to the second open end 40 and it has a generally rectangular shape with a width smaller than the width of the pocket 34. An adjusting pin 44 is connected to the pocket 34 and can be inserted into the pin hole 42.

A door or gate 46 (better shown in FIG. 1*a*) is a generally rectangular plate that includes at least one adjusting hole and a gate ridge 48, which has a first locking hole 50 located in a central position. The gate 46 slides through the pocket 34 and functions to release coins when their removal is desired, having a down position, which shuts off the coin removal, and an up position, which allows the removal of coins. In other words, the up position at least partially uncovers the coin removal opening 36, while the down position substantially covers the coin removal opening 36. The up position can have different settings, allowing an attendant the flexibility to adjust the removal rate of the coins. The pin 44 is used to fix the gate 46 in a particular setting, as desired by the attendant, by protruding through one of the adjusting holes located in the gate 46. To release coins, the attendant pulls the pin 44, raises the gate 46 to the desired setting by lining up one of the adjusting holes, if there are more than one, with the pin hole 42, and then pushing the pin 44 into both the pin hole 42 and the adjusting hole to fix the gate 46 in the up position. Consequently, the coins inside the coin bin 12 are ready for removal. For a higher coin removal rate the pin 44 should be inserted into an adjusting hole that is located further away from the gate ridge 48, while for a lower coin removal rate the pin 44 should be inserted into an adjusting hole that is located closer to the gate ridge 48. To prevent the removal of coins, the attendant pulls the pin 44 and lowers the gate 46 until the coin removal opening 36 is completely covered by the gate 46.

The front plate 24 preferably includes a handle 52 which is C-shaped and is made from a tube, such as a circular pipe. The handle 52 has in general three sections, a middle section 54 and two lateral sections 56, 58, each of the lateral sections being connected to the front plate 24 at a first pivoting point 60 and a second pivoting point 62. The handle 52 has two main positions, a collapsed position, as shown in FIGS. 2*a*–2*c*, and a transporting position (not shown). A purpose of the collapsed position is to make the coin bin 12 more compact, making sure that the handle 52 does not interfere with the coin processing or the coin removal. In the collapsed position, the handle 52 rests against the front plate 24, having the middle section 54 being positioned near the coin removal opening 36. A purpose of the transporting position is to allow the user the flexibility to move the handle 52 to a position that best fits the user's physical anatomy. For example, a taller person may lift the handle 52 higher than a shorter person. In the transporting position the handle 52 is pivoted upwards, by having an user raise the middle section 54 until the user reaches a comfortable position for using the handle 52 to push or pull the coin bin 12.

In other embodiments the front plate also includes identification plates 64 which are located near the second pivoting point 62. The identification plates 64 can be used to identify relevant information regarding the coin bin 12 or the coin machine 14, such as the coin bin model, the coin machine model, the owner of the coin bin 12, or the owner of the coin machine 14, etc. In other embodiments the identification plates 64 can be located in a different location, such as next to the first pivoting point 60 or next to the pocket 46.

The cover 28 is a lid that pivots on one end to the back plate 26 by using a first hinge 66 that covers nearly the entire width of the cover 28. The first hinge 66 allows the cover 28 to swing between an open position (FIG. 1*a*) and a closed position (FIG. 2*b*). In the closed position the cover 28 substantially covers the coin depositing opening 33, while in the open position the cover 28 at least partially uncovers the coin depositing opening 33. The coins are deposited or placed in the coin bin 12 through the coin depositing opening 33. The width of the cover 28 is the dimension of the cover 28 that is parallel to an imaginary straight line between the first side plate 30 and the second side plate 32, although it can be smaller.

The cover 28 includes a locking plate 68 that is connected to the cover 28 with a second hinge 70. Because the locking plate 68 is hinged to the cover 28, it is free to pivot around the second hinge 70 having in general a locked position and an unlocked position. In general, the locking plate 68 is a rectangular plate having a ridge 72 at one end. The ridge 72 has a second locking hole 74 which is centrally located on the ridge 72, and which has the same general size and shape as the first locking hole 50. Similarly, the ridge 72 has the same general size and shape as the gate ridge 48. When the locking plate 68 is in the locked position, the ridge 72 fits generally over the gate ridge 48 having the second locking hole 74 line up with the first locking hole 50 on the gate 46. Consequently, the locking plate 68 and the gate 46 can be locked using a single locking device, such as a padlock.

Therefore, the present invention contemplates a single-locking mechanism comprising the locking plate 68, the gate 46, and a single locking device that locks both openings to the coin bin 12.

Additionally, the cover 28 also includes a long slot 76 which is located in a generally central position for holding the locking plate 68 in a fixed position via a detent mechanism. When the cover 28 is in the open position, the long slot 76 can be used to prevent the locking plate 68 from interfering with the deposit of coins, by holding the locking plate 68 in a stationary position that does not interfere with the coin depositing opening 33. For example, the locking plate 68 can be swung upwards in a clockwise motion and laid flat on the cover 28 having the ridge 72 protruding through the long slot 76, wherein the ridge 72 can be temporarily secured in the long slot 76 using a detent mechanism or structure, e.g., a spring-loaded pin. The long slot 76 can also be used for the insertion of miscellaneous items after the coin bin 12 is locked by the user. Very often, for security reasons, the person transporting the coin bin 12 from one place to another cannot unlock it. However, additional items may have to be placed inside the coin bin 12, such as additional coins or verification receipts, after the coin bin 12 is locked. For example, when a person transporting the coin bin 12 delivers the bin 12, a verification receipt describing the status of the coin bin 12 (e.g., where the coin bin 12 was brought from, how much money is supposed to have, the name and signature of the transporting person, etc.) can be inserted through the long slot 76. Also, the long slot 76 can function as a visual check for an attendant to see how many coins are inside the coin bin 12, i.e., whether the coin bin 12 is full or empty.

Referring now to FIGS. 3*a*–3*d*, the coin bin 12 includes, in another embodiment, an interior sloped surface 78. The sloped surface 78 contains a plurality of planes which are arranged in angled positions that allows the coins to flow freely toward the coin removal opening 36 under the force of gravity. In one embodiment, the sloped surface 78 can be achieved by bending a single plate to achieve the desired plurality of planes. In another embodiment, the sloped surface 78 can be achieved by connecting a number of different plates, using commonly known means such as welding, soldering, or fasteners. The sloped surface 78, using the force of gravity, eliminates the necessity for manual intervention during the operation of removing coins. After the user opens the gate 46, the coins fall through the coin removal opening 36 until the coin bin 12 is completely empty or until the user closes the gate 46. In one embodiment the sloped surface 78 contains three planes (FIG. 3*b*): two symmetrical side planes that are located on either side of the coin removal opening 36 and that have a triangular shape, and a larger central plane. One side of each of the side planes is connected to the interior of the front plate 24, while another side is connected to the respective one of the first side plate 30 and the second side plate 32. The remaining side of each of the side planes forms a common side with the central plane. The central plane has a parallelogram shape, which has a large parallel side, a small parallel side, and two equal connecting sides. Each of the connecting sides form a common boundary with one side of the side planes. The small parallel side forms the bottom edge of the coin removal opening 36, while the large parallel side is connected to the back plate 26.

Figure 3A:
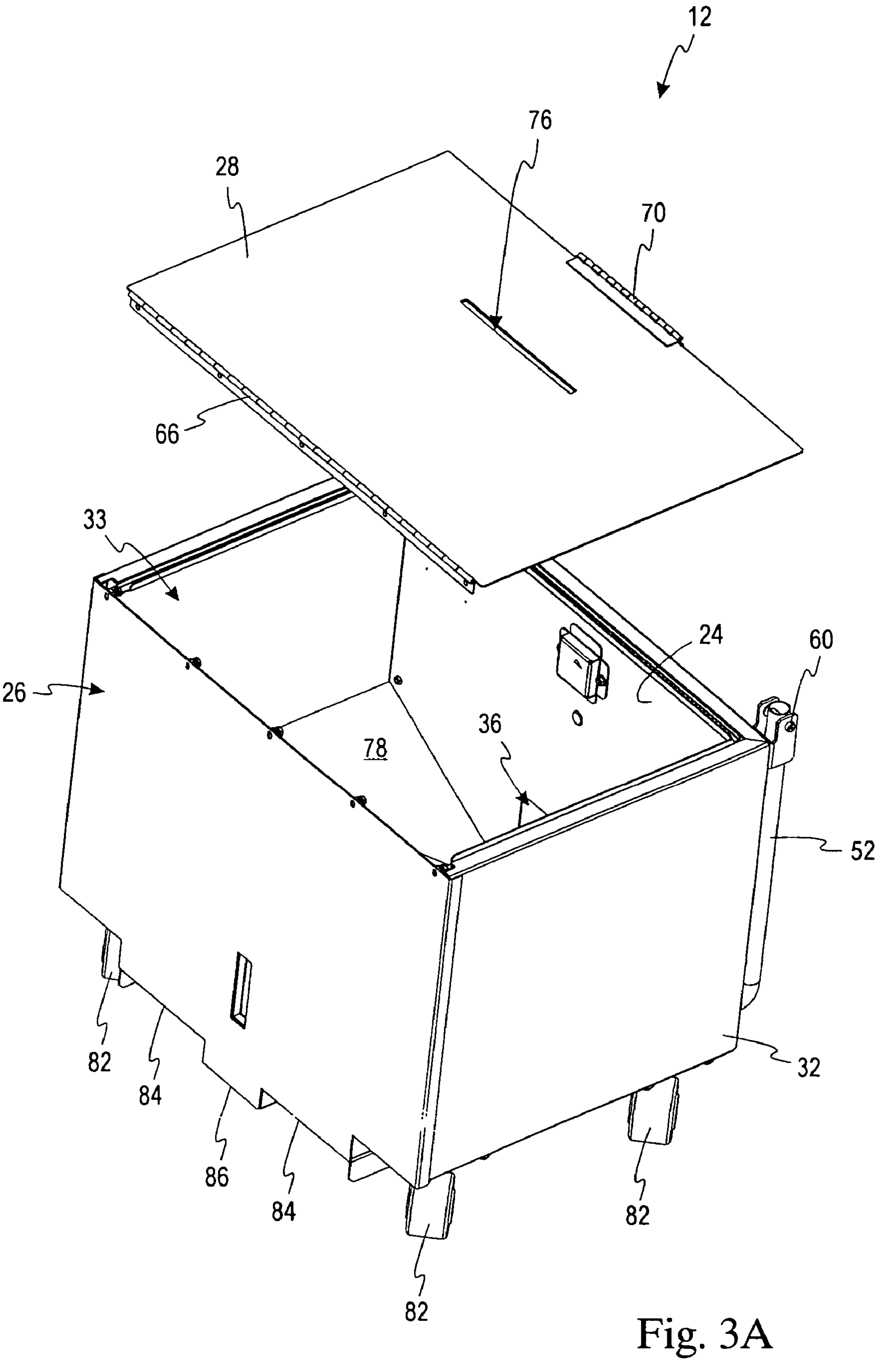
FIG. 3*a* is an exploded back-perspective view of the embodiment shown in FIG. 1*a;*
Figure 3B:
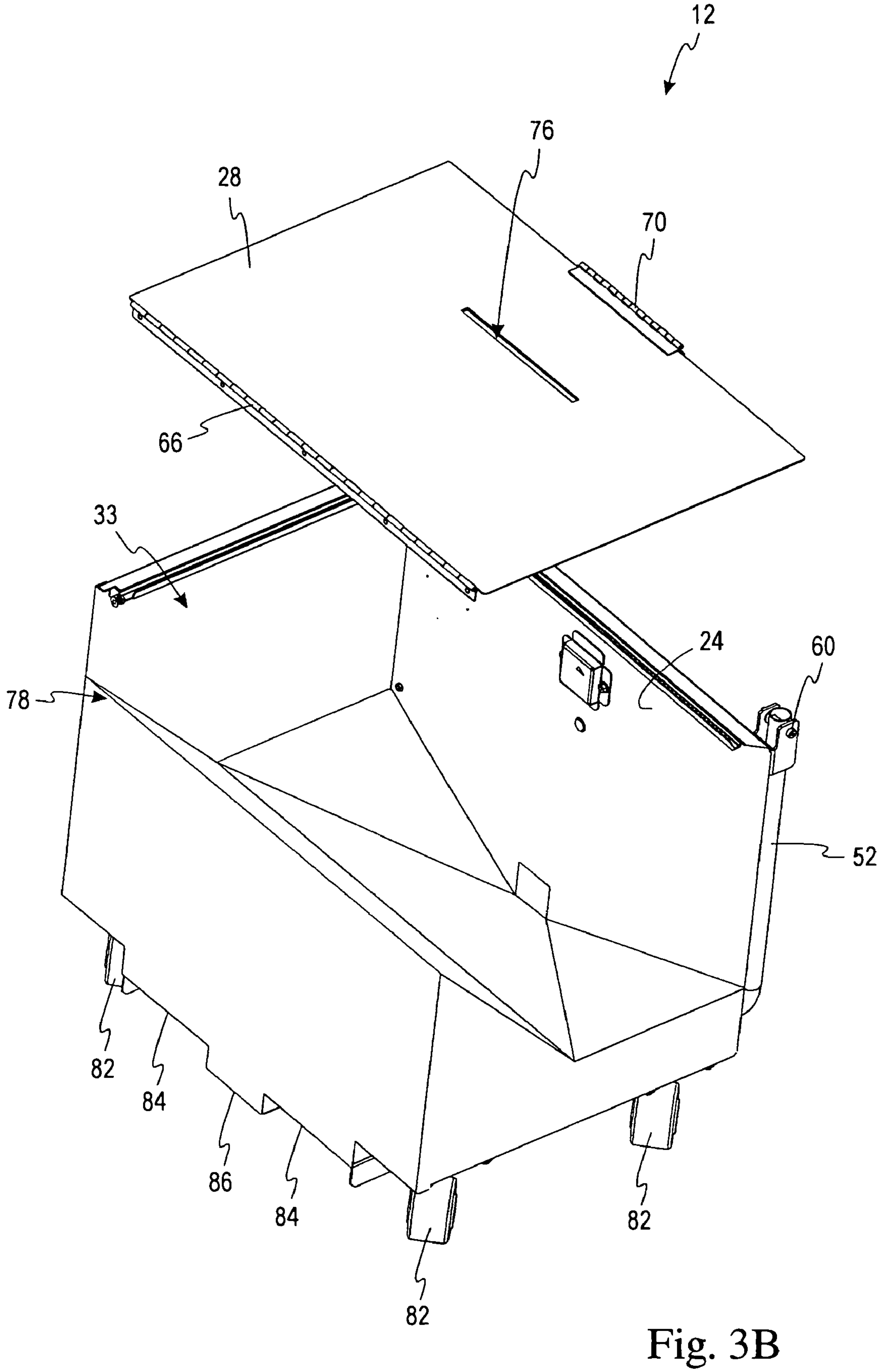
FIG. 3*b* is the same as FIG. 3*a* except that a side and a back plate are removed to show a sloped interior surface.
Figure 3C:
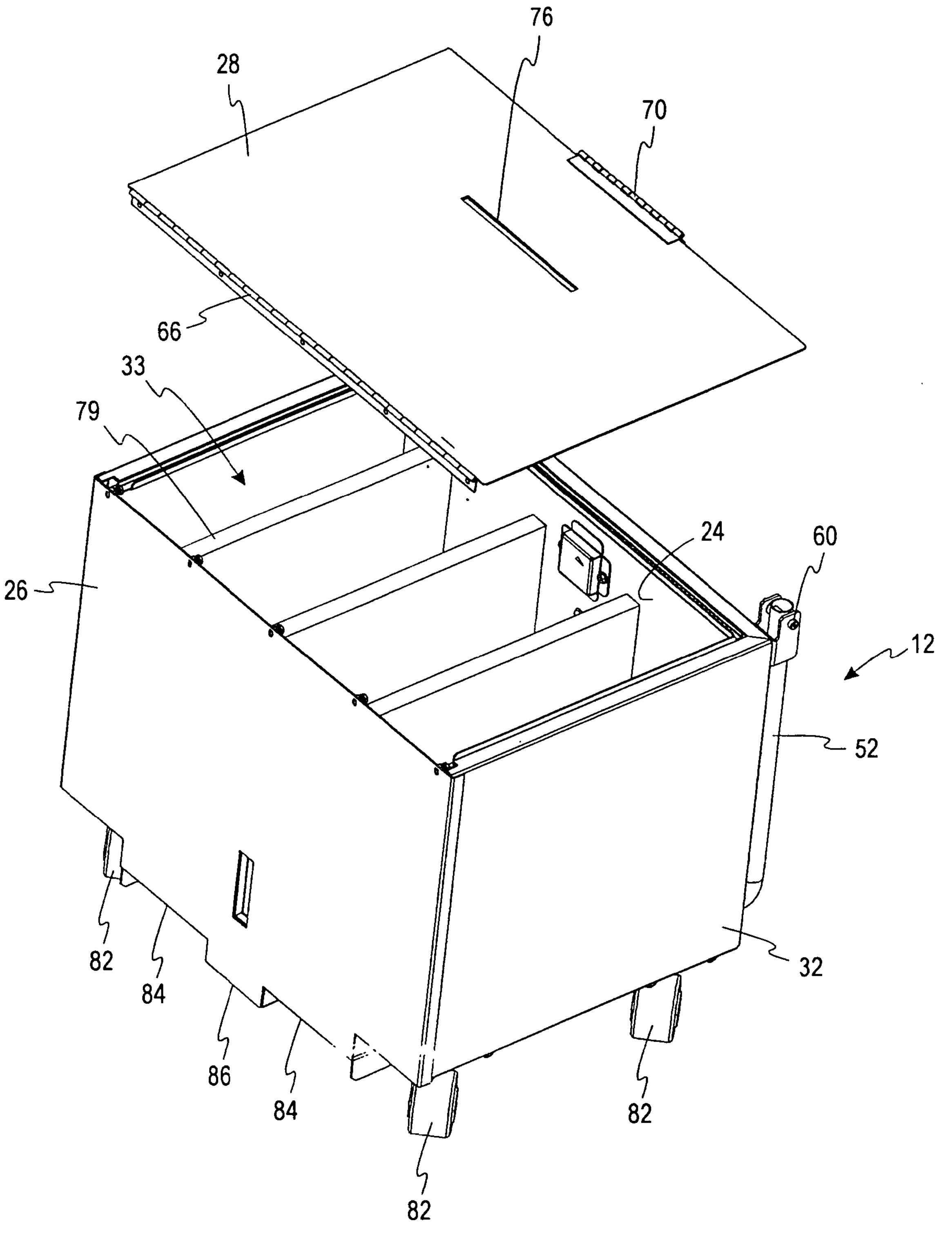
FIG. 3*c* is the same as FIG. 3*a* except that it includes a plurality of compartments.
Figure 3D:
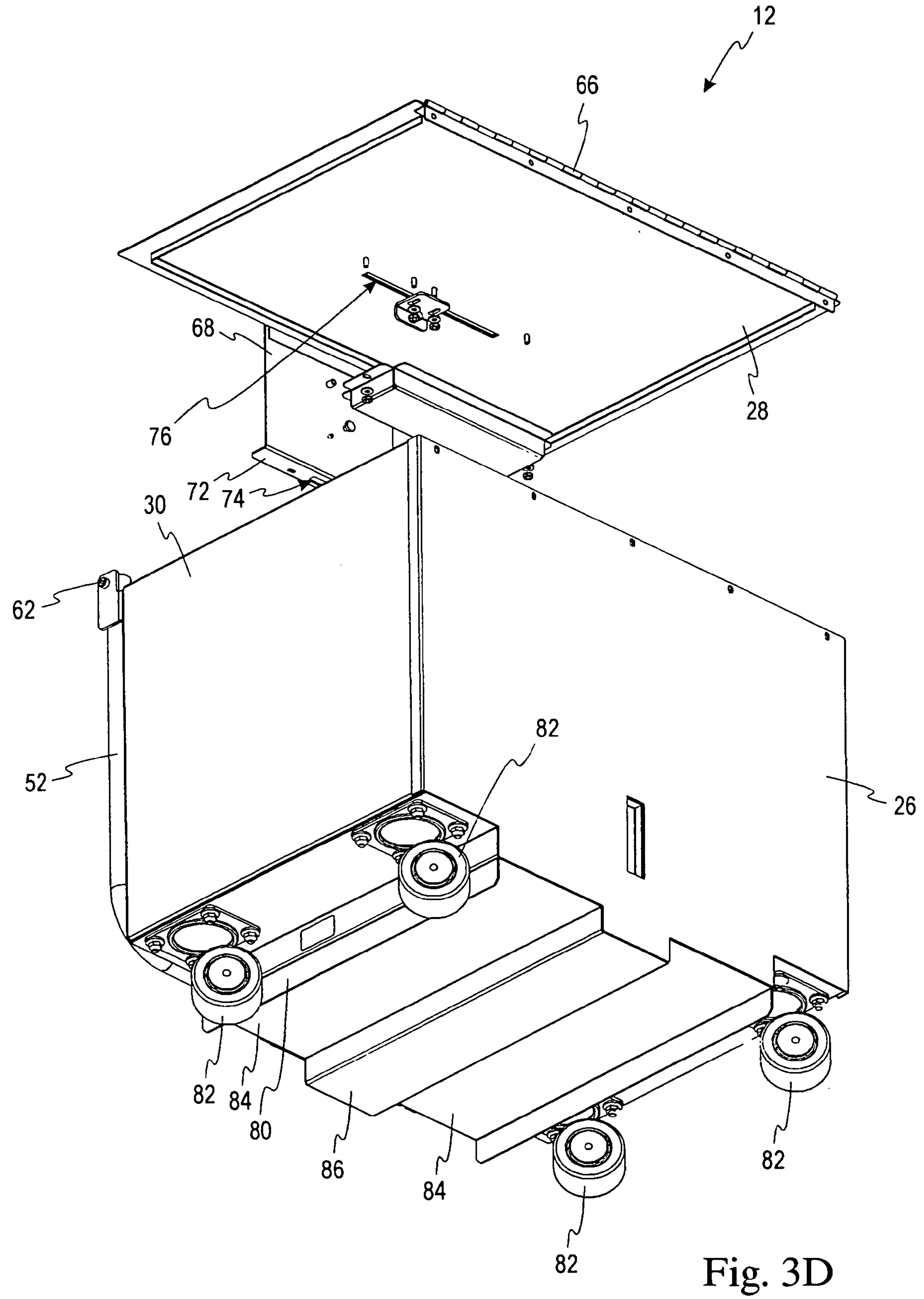
FIG. 3*d* is a bottom-perspective view of FIG. 3*a;*

In another embodiment the coin bin 12 includes a number of separating plates 79 for dividing the coin bin 12 into a plurality of compartments (FIG. 3*c*). The compartments can be used to sort the coins by denomination, or to contain bags for holding a smaller number of coins. The bags contain in general less coins and are therefore lighter in weight than the coin bin 12, making them easier to transport. The compartments may comprise a plurality of compartment doors for controlling the flow of said coins in each compartment, wherein each one of the compartment doors is individually moveable.

The coin bin 12 also includes a bottom plate 80 which includes a plurality of wheels 82. Four wheels 82 are located in each corner of the bottom plate 80 to facilitate the easy movement of the coin bin 12 from one place to another. The wheels 82 are readily available commercial casters, selected to withstand the several hundred pound weight of the coins and coin bin 12. In other embodiments, the number of wheels varies from two wheels to as many as desired.

In another embodiment, the bottom plate 80 preferably has a number of grooves 84 which are separated by a central bar 86. Each one of the grooves 84 and the central bar 86 has two ends which form a longer dimension, the length, and are oriented such that one end of the length is near the front plate 24 while the other end is near the back plate 26. One of the functions of the grooves 84 is to allow the transportation of the coin bin 12 by using a forklift device, such as a hand or a motorized truck. In other embodiments two more side bars can be located parallel to the central bar 86 such that they restrict the forklift device from moving sideways, towards the wheels 82.

In other embodiments of the present invention, any one or more of the sloped surface 78, the front plate 24, the first side plate 30, the second side plate 32, the back plate 26, the cover 28, and the separating plates can be covered with a laminated material having multiple layers. The laminated material has two outer layers which are made of a metal, and a thin inner layer which is made of a non-metal that holds the outer two layers together. The thin inner layer serves to dampen the vibrations of coins impacting the outer layers. The inner layer converts the vibrational energy into thermal energy. The laminated material comes in a variety of thicknesses, with the smallest one being about 0.04 inch and the largest being about 0.375 inch. Preferably, the laminated material is a stainless steel. Such materials are available through various sources, including Classic Sheet Metal in Schiller Park, Ill. A laminated material similar to the one that was described above is described in greater detail in U.S. patent application Ser. No. 09/812,334 entitled “Coin Processing Machine Having Coin-Impact Surfaces Made From Laminated Metal,” which was filed on Mar. 19, 2001 and is incorporated herein by reference in its entirety.

Figure 4:
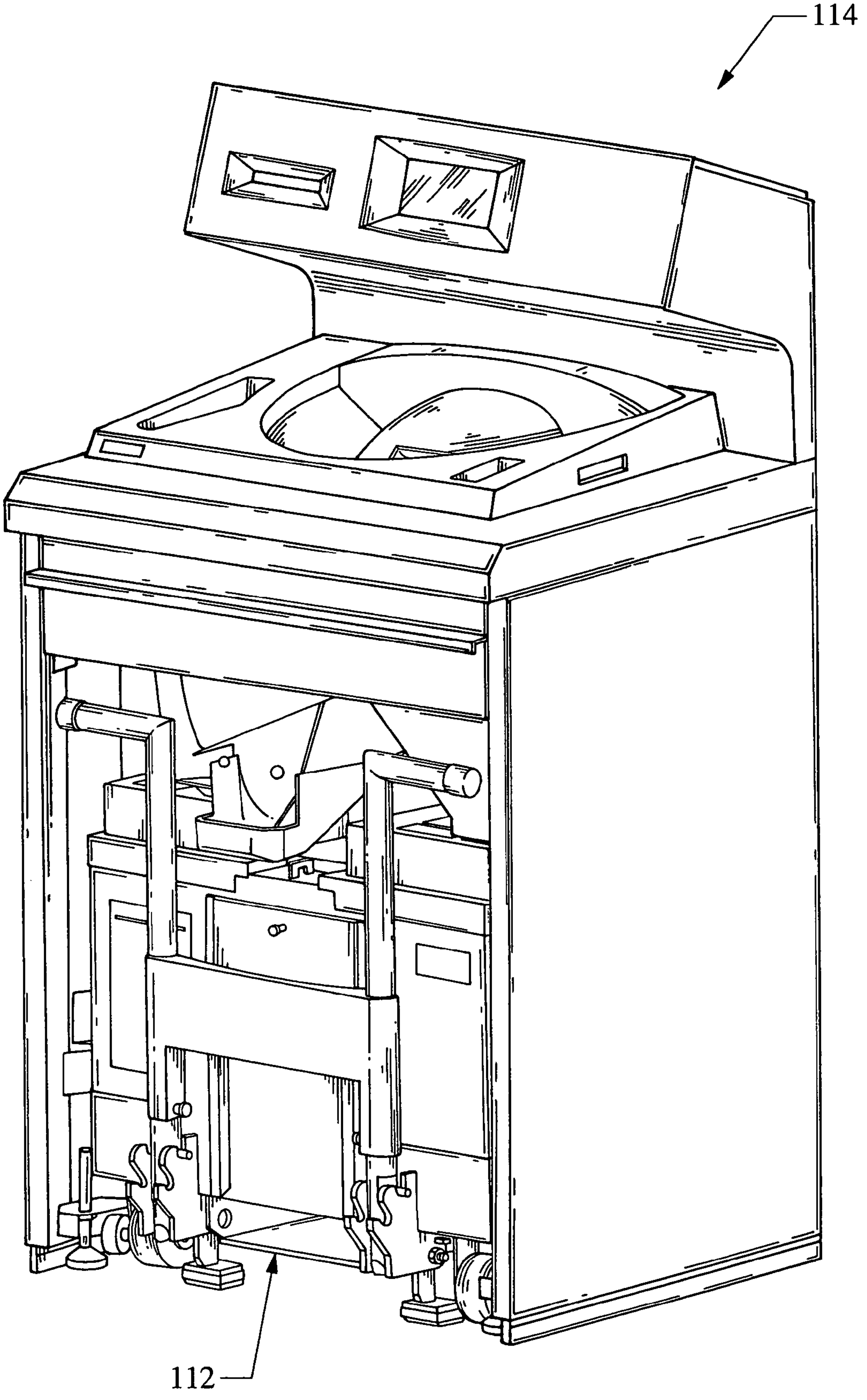
FIG. 4 is a perspective view illustrating a removable coin bin located inside a coin processing machine, according to another embodiment of the present invention.
Figure 5:
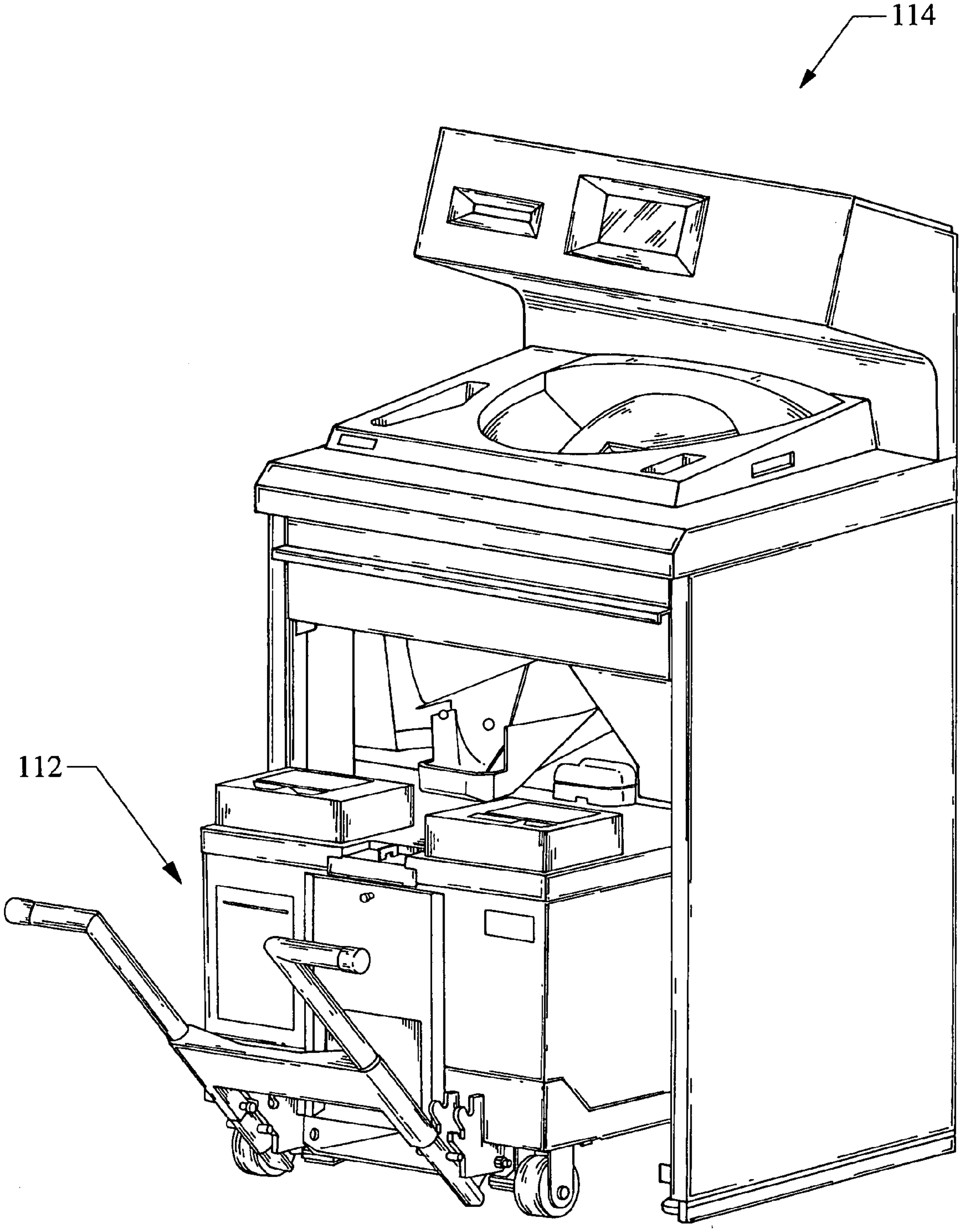
FIG. 5 is a perspective view illustrating the removable coin bin of FIG. 4 outside the coin processing machine.

Referring now to FIGS. 4 and 5, a coin bin 112 is shown in a couple of locations with respect to a coin processing device 114, in accordance with another embodiment of the present invention. In one of the locations the coin bin 112 is inside the device 114, for collecting coins processed by the device 114. When the coin bin 112 is ready for transportation to another facility, such as a coin storage facility, the coin bin 112 is removed from the device 114, as shown in FIG. 5.

Figure 6:
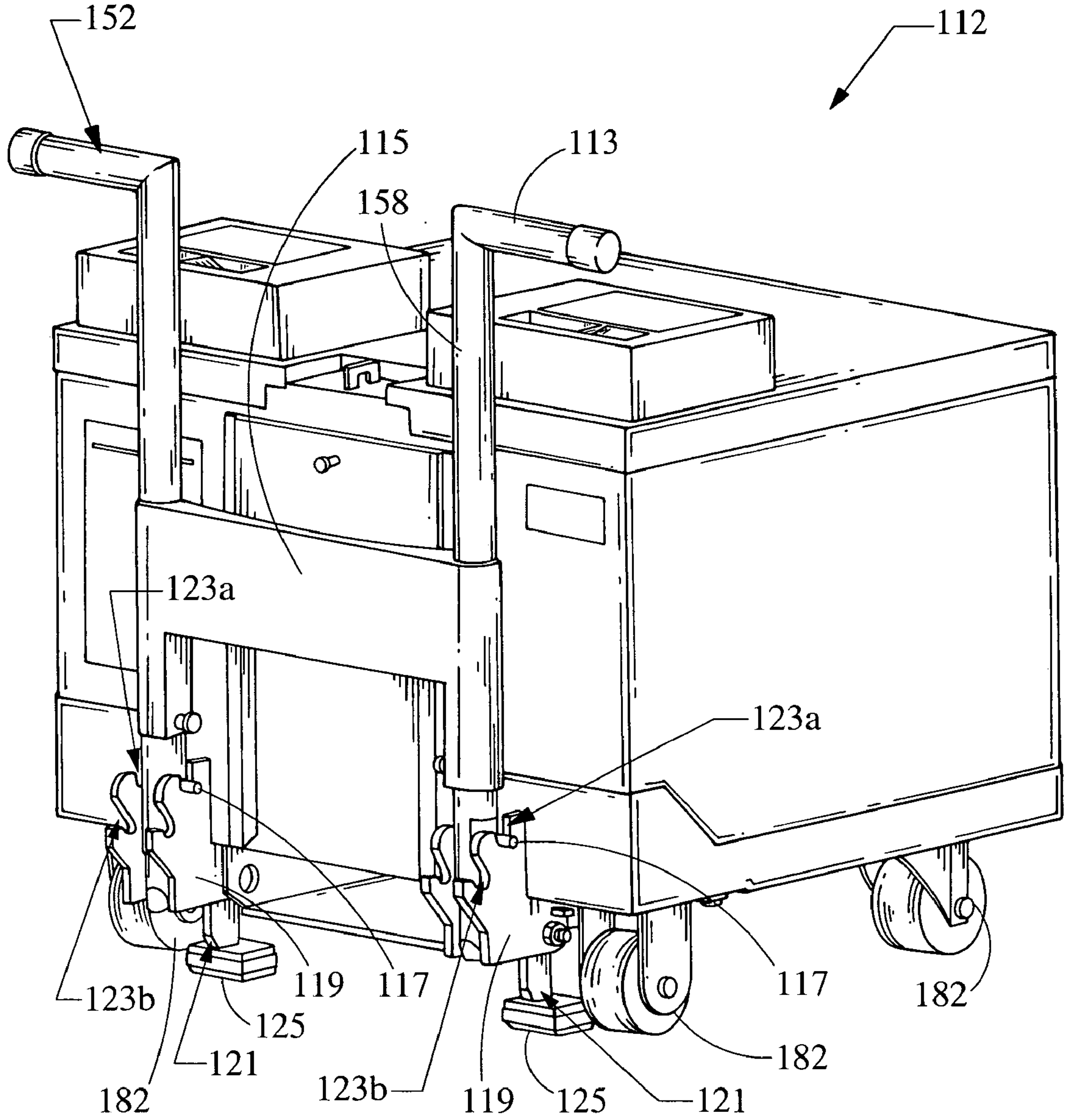
FIG. 6 is a perspective view illustrating the removable coin bin of FIG. 4.

Referring now to FIG. 6, the coin bin 112 includes a handle 152, a couple of brackets 119, a couple of static brake devices 121, and a plurality of wheels 182. Each of these components will be described in more detail below.

The handle 152 includes a couple of handlebars 113, a couple of outer pipes 158, a bar 115, and a couple of fixating pins 117. The handlebars 113 are joined to the outer pipes 158, which are connected by the bar 115. The handlebars 113 are used by an operator to grasp the handle 152 when transporting the coin bin 112.

The fixating pins 117 are mechanically attached to the outer pipes 158, having two fixating pins 117 on each outer pipe 158. The fixating pins 117 move together with the handle 152 both in translational and rotational directions. As described in more detail below, the fixating pins 117 are used to fixate, or locate, the handle 152 in at least one position when said handle 152 is generally pivoting around the brackets 119.

The coin bin 112 further includes the brackets 119 and the static brake devices 121. Each bracket 119 is connected to the handle 152 and attached to the coin bin 112. Each bracket 119 includes a plurality of grooves 123*a*–123*b*, which are located near one end of the handle 152. The brake devices 121 are each mechanically coupled to a respective bracket 119 and to the handle 152, and each includes a contact surface 125. The material for the brake devices 121 is selected based on properties of the material related to at least one of a frictional force, a compressive force, and a shear force. For example, the brake devices 121 can be made from a high-capacity fiber woven material and/or a rubber material, which can withstand relatively high frictional, compressive, and shear forces.

The brake devices 121 are generally used to prevent unintended movement of the coin bin 112 when the coin bin 112 is in a static, or stopped, position. The coupling of the brake devices 121 to the handle 152, which is described in more detail below, enables the pivoting, or rotation, of the brake devices 121 together with the pivoting of the handle 152. However, the coupling of the brake devices 121 to the handle 152 allows for the handle 152 to translate independently of the brake devices 121.

The coin bin 112 also includes a plurality of wheels 182, which are connected to a bottom exterior surface of the coin bin 112. Specifically, the wheels 182 include a pair of front wheels 182 and a pair of rear wheels 182. Each one of the front wheels 182 is located near a respective brake device 121. The wheels 182 are made at least in part from a phenolic and/or rubber material to add stability to and enhance control of the coin bin 112. The selected material is intended to support the weight of the coin bin 112 in both loaded and unloaded states, and also to provide improved control of the coin bin 112 during transportation.

Figure 7:
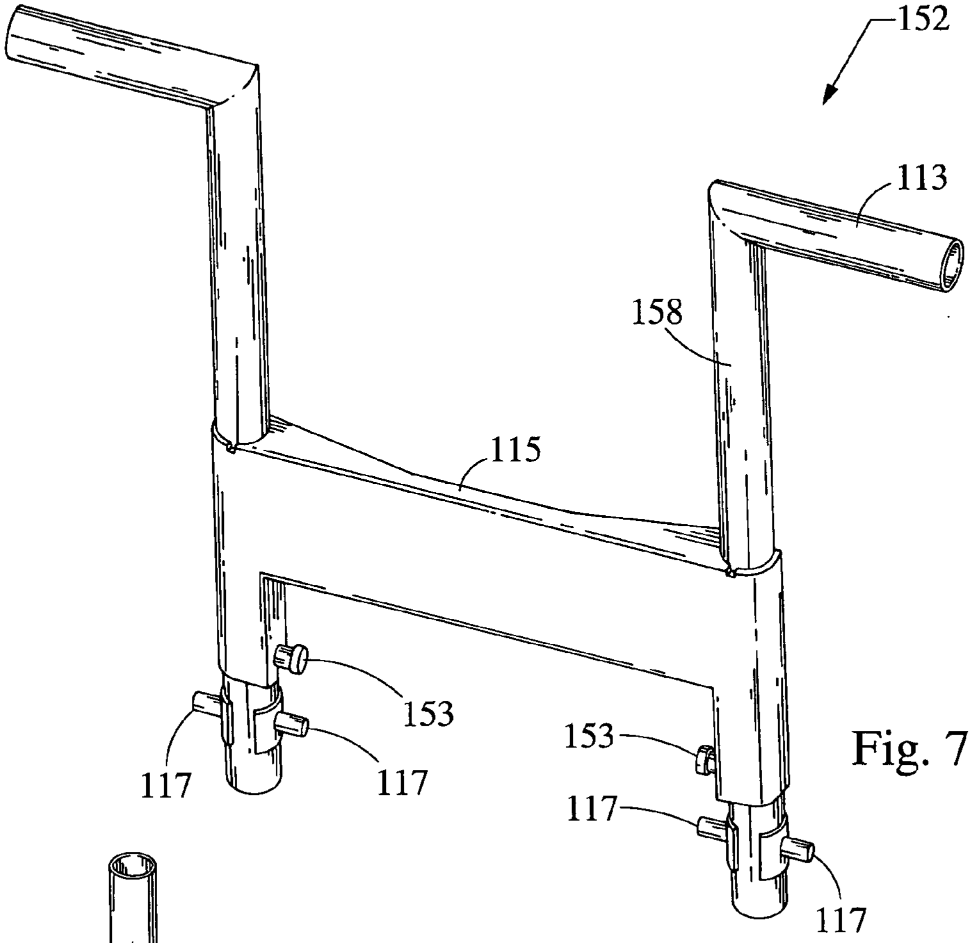
FIG. 7 is a perspective view illustrating a handle of the removable coin bin of FIG. 4.

Referring now to FIG. 7, the bar 115 includes a couple of locking pins 153, which are positioned on the inside of the two outer pipes 158. The locking pins 153 are spring loaded for locking in position the two outer pipes 158 relative to a couple of inner pipes 159, which are described in more detail below. In general, the handle 152 includes two motions, a translational motion and a rotational motion. The translational motion allows the outer pipes 158 to telescope along the inner pipes 159 by having an operator pull or push on the handlebars 113. In a raised position of the translational motion, the locking pins 153 lock the outer pipes with respect to the inner pipes 159.

As the operator pulls the handlebars 113, the outer pipes 158 slide in a direction away from the bracket devices 121 until the locking pins 153 snap in a predetermined locking position. Thus, when the locking pin 153 encounters an aperture in the inner pipe 159, the locking pin 153 protrudes through the aperture and secures the outer pipe 158 to the inner pipe 159. To place the handle 152 back in the lowered position, the operator pulls on each one of the locking pins 153 to release the force that locks the outer pipes 158 to the inner pipes 159, and lowers the outer pipes 158 along the inner pipes 159 back to a lowered position. In other embodiments, a plurality of apertures can be located along the inner pipes 159 for allowing the operator to select from a plurality of positions when locking the handle 152 in the translational motion.

Figure 8:
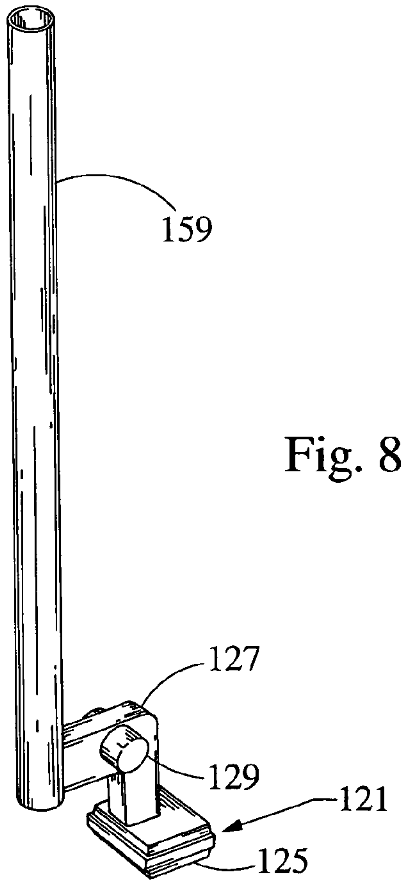
FIG. 8 is a perspective view illustrating a brake device of the removable con bin of FIG. 4.

Referring now to FIG. 8, one of the inner pipes 159 is shown according to one embodiment of the present invention. The inner pipe 159 is generally located inside a respective one of the outer pipes 158, wherein the outer pipe 158 and the inner pipe 159 function as a telescoping assembly. The inner pipe 159 is connected to a respective brake device 121 via a handle joint 127. The handle joint 127 includes a pivoting point 129 for pivoting of the handle 152 during the rotational motion. When the handle 152 is lifted along the axis of the outer pipes 158, the brake device 121 does not translate. However, when the handle 152 is rotated, the brake device 121 pivots around the pivoting point 129 together with the handle 152.

Figure 9:
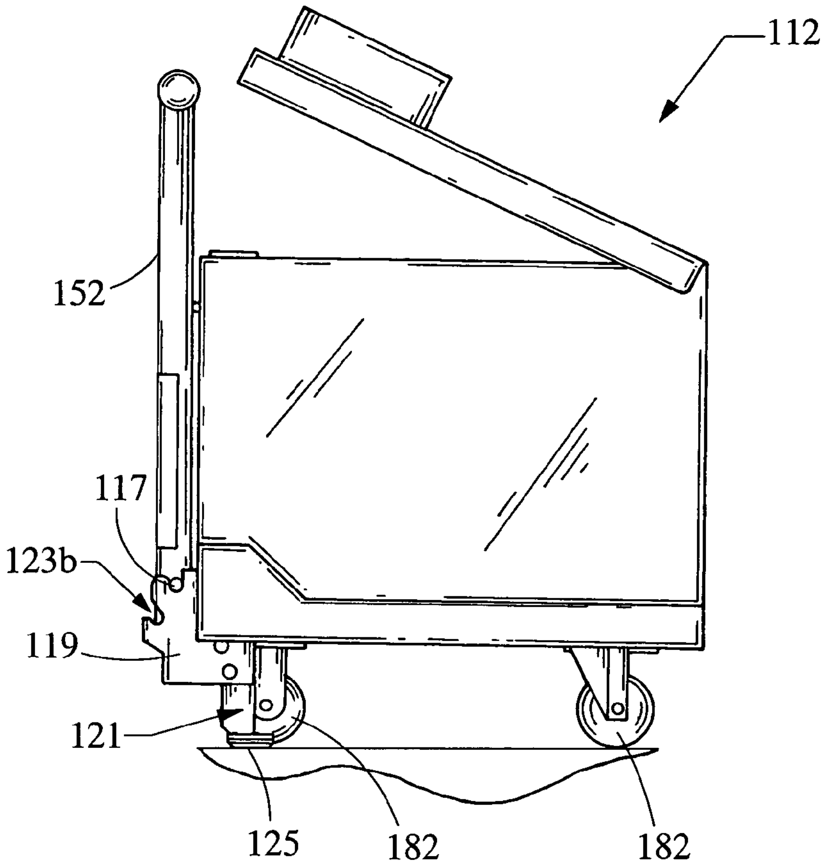
FIG. 9 is a side view illustrating the coin bin of FIG. 4 in a stopped position.

Referring now to FIG. 9, a stopped position of the coin bin 112 will be described. The handle 152 is in a generally vertical position, located near the main body of the coin bin 112. The fixating pins 117 are each inserted in a respective first groove 123*a* to prevent unintended movement of the handle 152. The brake devices 121 are also in a generally vertical position, having the respective contact surface 125 in contact with a floor surface on which the coin bin 112 is standing. Although the rear wheels 182 are in contact with the floor surface, the front wheels 182 are not in contact with the floor surface.

The coupling of the handle 152 with the brake devices 121 permits pivoting, or rotating, of the brake devices 121 in accordance with pivoting of the handle 152. In the stopped position of the coin bin 112, the handle 152 is located in its vertical position by the fixating pins 117, which are inserted in their respective first groove 123*a*. Accordingly, the brake devices 121 are also located into their respective vertical position because the brake devices rotate only when the handle 152 rotates. Because the front wheels 182 are lifted from the floor surface, the coin bin 112 is supported in the stopped position by the brake devices 121 and the rear wheels 182.

The contact surface 125 of each one of the brake devices 121 exerts a frictional force on the floor surface on which the coin bin 112 is standing. Thus, in the stopped position, the contact surface 125 prevents, or at least hinders, the movement of the coin bin 112. Preventing the movement of the coin bin 112 minimizes the likelihood of damaging property or injuring a person when an operator transporting the coin bin 112 has stopped moving the coin bin 112. For example, if the operator temporarily stops moving the coin bin 112, the operator puts the coin bin 112 in the stopped position to prevent unintentional movement of the coin bin 112.

Figure 10:
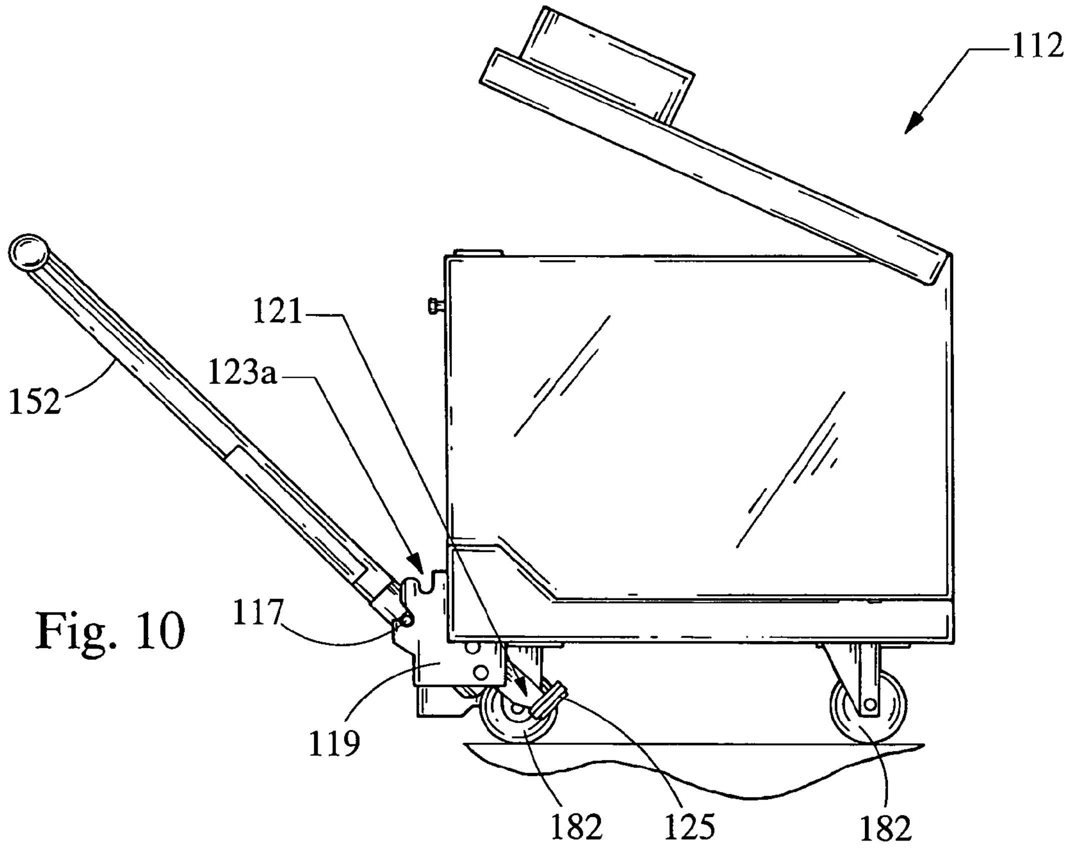
FIG. 10 is a side view illustrating the coin bin of FIG. 4 in a moving position.

Referring now to FIG. 10, a moving position of the coin bin 112 will be described. Initially, the operator lifts the handle 152 in the vertical direction. The lifting of the handle 152 removes the fixating pins 117 from their respective first grooves 123*a*, which allows the handle 152 to pivot generally around the bracket 119. The lifting of the handle 152, while it raises the fixating pins 117 upwards, does not produce a translational motion in the brake devices 121. Thus, the handle 152 and the fixating pins 117 translate in a direction parallel to the lifting direction independently of the brake devices 121. During the translational motion, the locking pins 153 function as described above in reference to FIG. 7.

After the fixating pins 117 have been disengaged from their respective first grooves 123*a*, the handle 152 is pivoted in a counterclockwise direction. Specifically, the operator lifts the handle 152 and then pulls it towards him or her. The rotational movement of the handle 152 also rotates the brake devices 121, which also rotate in a counterclockwise direction. As the brake devices 121 rotate, the contact surfaces 125 are removed from contact with the floor surface, and, consequently, the frictional force between the contact surfaces 125 and the floor surface is removed. The operator can rotate the handle 152 to a counterclockwise angle that is most comfortable to the operator for transporting the coin bin 112.

Generally simultaneously with the rotation of the brake devices 121, the coin bin 112 is lowered and is now supported by the front wheels 182, instead of the brake devices 121. Because now the contact surfaces 125 do not apply a frictional surface on the floor surface, the coin bin 112 is free to move, or roll, on all four wheels 182. The operator can push or pull the coin bin 112 to a desired location, such as a coin storage facility.

Placing the coin bin 112 back from the moving position to the stopped position is generally accomplished by reversing the previous steps. Initially, the operator stops the movement of the coin bin 112. Then, the operator rotates the handle 152 in a clockwise direction until the handle 152 is in a generally vertical position. When the fixating pins 117 are located above the first grooves 123*a*, the operator places the fixating pins 117 into the first grooves 123*a* by disengaging the locking pins 153 from their respective locking positions. After the locking pins 153 have been unlocked, the fixating pins 117 can be placed into the first grooves 123*a*, for example, by pushing on the handle 152 in a direction parallel to the axis of the handle 152, or by releasing the handle 152 to move downward under the force of gravity. As the operator rotates the handle 152 in the clockwise direction, the brake devices 121 make contact with the floor surface, via the contact surfaces 125, and the coin bin 112 is now being supported only by the rear wheels 182 and the brake devices 121.

Alternatively, other embodiments can vary from the above-described embodiments. For example, a single wheel 182 can be used instead of the pair of front wheels 182, or instead of the pair of rear wheels 182. Thus, the coin bin 112 can have only three wheels 182. Optionally, a single brake device 121 can be used instead of two brake devices 121. For example, a brake device 121 can be centrally located to provide more stability when the coin bin 112 is in a stopped position. In other embodiments, one or more of the actions required for transporting the coin bin 112 can be automated to minimize human intervention. For example, the pivoting of the handle 152 can be performed by using a motorized system.

In another embodiment, a pair of optional second grooves 123*b* can be used for adapting the handle 152 to coin bins of various sizes and/or geometries. For example, a coin bin of a smaller size might require a handle 152 to be angled more towards a horizontal position than towards a vertical position when the coin bin is in the stopped position. The position of the handle 152 in the static position or the moving position of a coin bin can be determined based in part on how comfortable the operator might be when grasping the handlebars 113 of the handle 152. Alternatively, the second grooves 123*b* can be used to provide an optional position for the handle 152 in either the moving position or the static position of the coin bin.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A removable coin storage apparatus being used in a coin processing device, said apparatus comprising:

a removable bin for storing and transporting coins, said removable bin having a stopped position and a moving position; and a brake device coupled to said removable bin for preventing movement of said removable bin in said stopped position, said brake device having a handle that is pivotable between a first position and a second position, each one of said first position and said second position corresponding to one of said stopped position and said moving position of said removable bin, said brake device having a contact surface for exerting a frictional force on a floor surface in said stopped position of said removable bin, said handle moving in a translational motion independently of said brake device and in a rotational motion together with said brake device, said handle including a fixating pin for locating said handle in said stopped position of said removable bin, said fixating pin moving in a translational motion and a rotational motion together with said handle.

2. A method for transporting a removable coin storage apparatus located in a coin processing device, said method comprising:

storing a plurality of coins in a removable bin;

raising a front wheel of said removable bin to prevent physical contact between said front wheel and a floor surface when said removable bin is in a stopped position;

contacting a brake device to said floor surface when said removable bin is in said stopped position;

sliding an outer pipe of a telescoping handle along an inner pipe of said telescoping handle to lift said telescoping handle from a position fixed via a fixating pin;

restraining relative movement between said outer pipe and said inner pipe by locking said handle in a locked position via a spring loaded locking pin; and pivoting said handle in a counterclockwise position relative to an attachment area between said handle and said brake device to remove contact between said brake device and said floor surface.

3. The method of claim 2, further comprising unlocking said spring loaded locking pin to permit relative movement between said outer pipe and said inner pipe of said handle.

* * * * *

UNITED STATES PATENT AND TRADEMARK OFFICE

CERTIFICATE OF CORRECTION

PATENT NO. : 7,243,773 B2 
APPLICATION NO. : 10/991017
DATED : July 17, 2007
INVENTOR(S) : Steve T. Bochonok et al.

It is certified that error appears in the above-identified patent and that said Letters Patent is hereby corrected as shown below:

In the Title Page, Left Column, please replace Section (75) Inventors: with the following:

-- (75) Inventors: Steve T. Bochonok, Wauconda, IL (US);
John R. Blake, St. Charles, IL (US) --

Signed and Sealed this

Tenth Day of June, 2008

JON W. DUDAS
*Director of the United States Patent and Trademark Office*